Patented Nov. 7, 1933

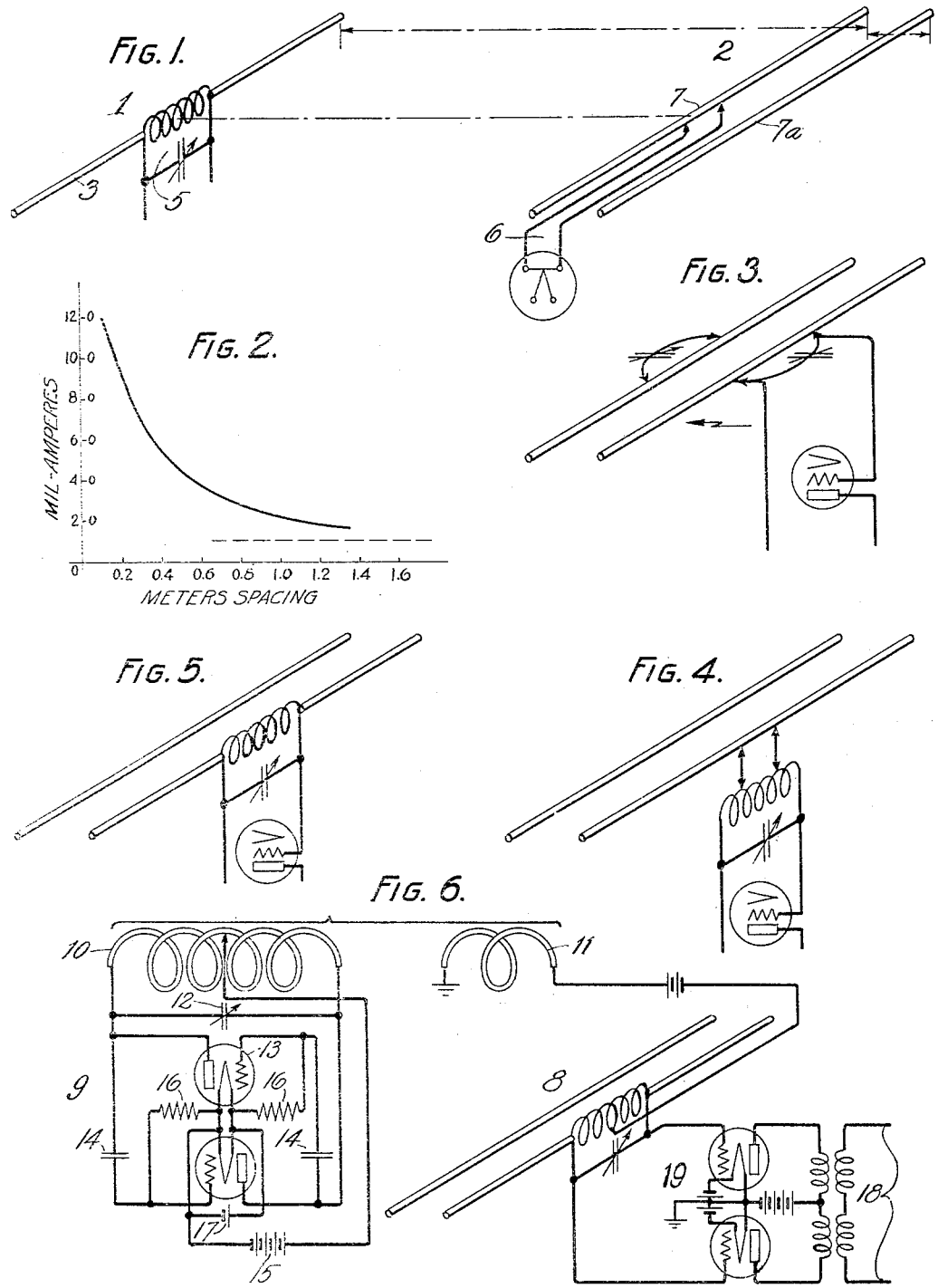

1,934,412

UNITED STATES PATENT OFFICE 1,934,412

RADIO RECEIVING CIRCUIT

Carl R. Englund, Freehold, N. J., assignor to Bell Telephone Laboratories, Inc., New York, N. Y., a corporation of New York Application March 24, 1928. Serial No. 264,305

5 Claims. (Cl. 250—11)

This invention relates to radio receiving circuits particularly as adapted for the reception of relatively short waves, i. e., waves whose lengths are of the order of a few meters.

An object of the invention is to more effectively absorb the energy associated with radio waves, and especially relatively short waves, and therefore to obtain an increased receiving antenna current.

A related object of the invention is to reduce the radiation resistance of a receiving antenna, that being one way, particularly appropriate for short wave receiving circuits, of promoting effective reception.

A still further object of the invention is to increase the sharpness of resonance of a short wave receiving antenna and therefore to increase its frequency selectivity.

On account of the reciprocity principle expressed by Rayleigh's law the principles of the invention are applicable to transmitting circuits although so far applied only to receiving circuits. Further objects of the invention accordingly are expressible in the same terms as above but directed to transmitting circuits.

In the circuit embodying the invention, as adapted especially for short wave reception, the usual linear conductor comprising the wave absorbing structure is supplemented by a parallel, closely adjacent, "free" conductor, or a "passive twin" conductor. It has been found that both the sharpness of resonance and the antenna current observed in the "active" conductor, to which conductor the utilization circuit is connected, is thereby increased and that the effect is, to a close approximation, inversely proportional to the spacing between the active and passive conductors. It has also been found that the resonant wave length of the pair of conductors approaches a value equal to one-half the length of the individual conductors as the spacing decreases.

In short wave reception, using a single absorbing conductor, the maximum energy absorption is a function of an optimum length of such conductor determined principally by the resonance period of it. Therefore the absorption may not be increased indefinitely by increasing the length, or any other geometrical characteristic, of the conductor. In this respect as a practical matter, the conditions favoring short wave reception are radically different from those favoring long wave reception, since in the latter the energy is a function of the exposure of the absorbing conductor to the incident waves and therefore of the length of such conductor since it would be impracticable to give an antenna a length comparable with the optimum length required by this invention.

The invention therefore provides a unique method or means for "stepping up" the antenna current, and especially a method of increasing it beyond the maximum limits fixed by prior practice in short wave reception.

Analogously to the conditions attending transfer of energy in conventional circuits from one medium having a certain resistance to another medium having a certain resistance, there may be imputed in the operation of radio reception a similar transfer from a medium having a certain resistance (the so-called radiation resistance of the receiver) to another medium having a certain resistance (the ohmic resistance of the antenna). With the usual relative value of those two resistances, in a short wave receiver, these requirements are more nearly satisfied by a decrease of the radiation resistance, the requirements, as to the relative values of the two resistances, as effecting the amount of energy transferred being similar to that of the conventional case. This is accomplished by the arrangement of the invention, i. e., a large part of the current step-up may properly be ascribed to this effect.

The theory on which the phenomena of the invention depend is somewhat obscure and is furthermore not subject to simple analysis. Since it is not a prerequisite for the practice of the invention, it will not be attempted here or in the detailed description. Only a few observations will be made regarding it.

To a certain extent the phenomena attending the reception of very short waves, say of the order of a few meters in length, may be predicated on the conditions existing under the same circumstances in long wave reception. This would require that the two antenna conductors with their distributed and mutual capacities, be treated as a tuned loop circuit, the conductors constituting inductance elements. However, contrary to the necessary postulates from long wave practice, of decreasing the size of the loop by decreasing the space between the conductors, the antenna current in applicant's circuit increases instead of decreases as a result of such operation. This further indicates the unique quality of the invention.

As a practical matter in considering either a short wave transmitting or a short wave receiving antenna, it is perhaps better to think in terms of standing current waves resulting from an interaction, under critical conditions of an incident and a reflected current wave along the conductor. Such standing wave will be most pronounced when the wave carrying conductor terminates in a pure reactance. This would be the case of a single rectilinear conductor, and it results in such an instance, that the conductor has a natural period of its own, analogously to the natural period of an organ pipe. The conditions are somewhat similar in the special case here considered in which there are two parallel receiving conductors, since such conductors would be terminated by the inter-conductor capacity. The conditions are complicated by the effect of the capacities to earth unless the conductors are raised to a relatively great height above the earth, by the dephasing effect resulting from the different times of incidences of the radiated waves on the two receiving conductors, and by the effect of the different field strengths in space at the two conductors, this latter effect, of course, approaching zero with increasing distance from the transmitter and with decreasing spacing of the receiving conductors. It is clear, however, that with close spacing the currents in the two conductors are nearly anti-phased so that a condition exists which is analogous to that of an anti-resonant circuit, the "stepped up" current being limited only by the ohmic losses in the conductor. In order that these losses may be small, each of the conductors should preferably have the physical structure of a quite massive hollow pipe of good conducting material.

For an understanding of the invention and for an illustration of practical forms of circuits in which it may be embodied, reference may be had to the accompanying drawing, in which:

Fig. 1 is a diagrammatic representation which is intended to disclose not only the basic features of the invention but also the particular layout used in the experimental work whose results are shown in the curve, Fig. 2.

Fig. 2 is a curve designed to illustrate the effect of interposing a passive twin conductor in the same radio field as, and closely adjacent to, a short-wave radio receiving conductor, the values plotted having been obtained by the use of the arrangement illustrated in Fig. 1;

Figs. 3, 4 and 5 each illustrates a practical antenna structure embodying the principles of the invention, and means for coupling the same to a utilization circuit; and Fig. 6 illustrates a receiving circuit as a whole embodying the antenna of the invention. It may also be taken to illustrate the high frequency portion of a double-detection receiver.

Referring to Fig. 1, the reference numeral 1 is intended to identify a symbolic representation of a short wave transmitting circuit, the reference numeral 2 similarly representing a receiving circuit, the former including the transmitting antenna 3, and the latter the corresponding receiving antenna 4. In deference to the preferred practice in the short wave communication art, these antennæ are illustrated as comprising rectilinear conductors. For the same reason they are disclosed as horizontal, in the same plane, and, for most effective radio coupling, substantially parallel. The tuned circuit 5 typifies a means for impressing a potential of a desired frequency on the transmitting antenna. As a practical matter such a transmitting antenna would have a critical length determined by the wave length to be radiated.

The conductor 7, of the receiving antenna 4, may be termed the "active" conductor since thereto is connected the utilization circuit. This circuit, that is, circuit 6 of the drawing is indicated diagrammatically herein as containing a thermocouple, although, of course, in practical forms of radio receiver for intelligence reception, this type of circuit would be replaced by means for reproducing a signal wave impressed on the transmitting circuit 1. The thermocouple is illustrated in this instance since the purpose of the figure is to disclose the layout of an experiment for determining the effect on the current, in a radio receiving antenna such as conductor 7, of interposing a "passive twin" conductor 7a in the same radio field and closely adjacent to it. The current in the circuit 6 is a function of the current in conductor 7. The conductor 7a, as indicated by its name, is isolated in space except for the effects of mutual action between the two conductors. It was found that the current in the active conductor and therefore in any short-wave rectilinear antenna is very greatly increased when a "passive twin" is thus opposed to it in substantially parallel relation and within a distance comparable with the length of the active conductor, and that such current increases rapidly with the decrease in spacing between the conductors. The connecting terminals of circuit 6 may be separated at varying distances in order to provide a desired mean response in the indicating device connected to the thermocouple. These terminals should be connected to the conductor symmetrically about its center, if a maximum reading is to be obtained.

Fig. 2 illustrates the effect of varying the spacing between the conductors 7 and 7a of Fig. 1, conductor 7 being fixed and conductor 7a being movable in a plane including conductors 3 and 7. The values for which the curve is plotted represent values derived from a particular experimental test at about 5 meters wave length. The abscissæ are spacings in meters and the ordinates are current readings in mil-amperes. The dash line immediately below the curve represents the mil-ampere reading when the conductor 7a is removed to an infinite distance, and therefore the reading in a single element antenna. The ordinates of the curve therefore should be compared with the ordinate of such dash line to obtain a measure of the current step-up resulting from the use of the passive twin conductor 7a. Although not shown in the drawing the use of the passive twin conductor results also in a very marked increase in the sharpness of resonance, and therefore of the frequency selectivity, of the antenna as a whole. It was found that the natural period of the conductor pair approaches the value $\lambda=2L$ as the spacing decreases. The minimum spacing of the conductors is, in a practical case, limited by the deviation from true rectilinearity and by the movements of such conductors, as effected, for example, by air currents.

In order to prevent complications due to the ground, the receiving conductors should be held well above the earth. In the tests described they were mounted at a height above ground of about 2.55 meters. For frequencies comparable with those used it is expedient to use conductors having very small ohmic resistances. The conductors used in the tests were made of ordinary ½" copper and brass pipe.

It was noticed in the tests that as the spacing increased, that is, as the curve approached the tangential line indicating the current for infinite spacing, it tended to pass through cyclical variations of amplitude having a sine wave form. This phenomenon is due to the fact that the phases of the waves picked up by the two conductors, due of course to their non-coincidence in the radiant energy field, tend to be different and that when there is a relative movement of the conductors the phase relation correspondingly varies. This effect becomes appreciable only for separations greater than those which would be used in practice and which correspond to the abscissæ of the curve of Fig. 2.

Figs. 3, 4 and 5 illustrate various practical means for connecting a utilization circuit to the active absorbing conductor and for accentuating the effect of the conductors proper by what amounts to secondary tuning. In each of these figures the specific connected circuit is immaterial. It might be, for example, either a high frequency amplifier, or a detector.

In Fig. 3 the utilization circuit is connected across a variable middle portion of the active conductor, a variable condenser being used for secondary tuning. The effect of this mode of connection may be accentuated as shown by a substantial duplication of elements, so far as concerns the secondary tuning, at the passive twin conductor. The tuning may be varied either by varying the capacity or by varying the separation of the variable taps to the conductor, this latter variation effectively causing a variation of inductance in the portion of the conductor between such taps.

Fig. 4 illustrates a slight variation of the means similarly disclosed in Fig. 3, the principle being obvious from the explanation of Fig. 3 and from the analogy to practice generally relating to selective transmission of high frequency waves.

Fig. 5 illustrates still another variant of the same general principle, the circuit means embodying it being equally as obvious as that illustrated in Fig. 4.

It should be understood with respect to the modifications illustrated in Figs. 4 and 5 that the passive twin conductor of either or both may have adjunctary tuning elements after the manner shown in Fig. 3. Of course, many other expedients having the same ultimate purpose of efficiently selecting and transmitting a certain frequency are readily suggestible to one skilled in the art, from conventional practice in the high frequency art.

Fig. 6 illustrates an embodiment of a practical receiving circuit including the antenna of the invention. The antenna 8 is specifically the same as the one disclosed in Fig. 5. The received energy is impressed, with local heterodyne or homodyne source indicated generally by 9, on the balanced modulator 19. The resultant demodulated current which may be the reproduced signal current or a modulated intermediate frequency carrier wave, depending on whether single or multi-stage detection is used, flows in circuit 18. If multi-stage detection is used the circuit 18 will be connected to another modulator which may be similar to modulator 19, otherwise the circuit is connected to an indicator. The illustrated balanced modulator is of the type disclosed in greater detail in U. S. patent to Carson 1,343,306, June 15, 1920. It is of a conventional form now very well known in the art. The received energy is impressed differentially on the input elements of the two electric discharge devices comprised in the modulator, and the energy from the local source is impressed on the modulator conjugately with respect to the received energy, i. e., on the input elements of the modulator in the same phase. The result is similar to that achieved by a simple detector involving a single electric discharge device except that there is an accentuation of effect, and more important still, a balancing to ground of the receiver.

The local oscillator 9 impresses its wave on the modulator through coupled inductor elements 10 and 11. The inductor element 10 functions as the principal inductance of the frequency determining circuit of the oscillator, the remaining portions of such frequency determining circuit being constituted principally by the variable condenser 12, the inter-electrode capacities of the two electric discharge devices 13 and condensers 14, these latter condensers being necessary in order to separate the plate from the grid of each pair of electrodes connected to terminals of the frequency determining circuit, so far as concerns direct current, and therefore to permit the effective use of the direct current plate supply source 15. The grid leak resistances 16 and the filament excitation source 17 function in the usual manner to respectively determine a desired negative grid biasing potential, and to insure an adequate emission of electrons from the filaments. The plates, grids and filaments are represented by their usual conventions, and do not require specific description.

The oscillator as a whole comprises effectively a combination of two Hartley type oscillators, each as disclosed for example, in U. S. patent to Hartley 1,356,763. October 26, 1920 using a common frequency determining circuit, the electric discharge devices being connected to such frequency determining circuit in push-pull relation. This modified form of the conventional Hartley oscillator is not the invention of applicant and is old and well known in the art. In short-wave oscillators, such as that contemplated by this invention, it is difficult to avoid including casual inductances in the frequency determining circuit, which if present might make it impossible to obtain the desired high frequencies. This condition makes it desirable to use as short leads as possible. It has been found that this may be best achieved by using the type of oscillator shown.

For the same reasons that require the absorbing and transmitting antenna conductors to be made in the form of quite massive hollow metallic elements the conductor elements 10 and 11 should preferably also have that form as shown. In a particular instance, when the circuit of Fig. 6 was used, these inductance elements were made of ⅛" copper tubing, four turns being used in the case of element 10 and one turn in the case of element 11. An oscillator such as that disclosed in Fig. 6 may be used in connection with the transmitting circuit of Fig. 1.

The novel features which are believed to be inherent in the invention are defined in the appended claims.

What is claimed is:

1. A radio receiving circuit comprising a radio antenna conductor, a utilization circuit connected thereto, and a parallel twin conductor of substantially the length of said antenna conductor in proximity thereto and completely physically isolated therefrom and from ground, the spacing between said conductors being as small as possible consistently with the necessary relative physical isolation thereof.

2. A radio receiving circuit comprising a linear receiving conductor, a utilization circuit connected thereto, and a parallel twin conductor of substantially the length of said receiving conductor in parallel with and in proximity to said receiving conductor and completely physically isolated therefrom and from ground, the spacing between said conductors being as small as possible consistently with the necessary relative physical isolation thereof.

3. The combination recited in claim 2, in which the lengths of said conductors are comparable with the length of the wave to be received.

4. In combination, means for producing a radiant energy field, a rectilinear absorbing conductor in said field whose length is substantially twice the wave length of the waves in said field, a utilization circuit connected to said conductor, and a parallel twin conductor in parallel with said conductor, and completely physically isolated therefrom and from ground, the spacing between said conductors being as small as possible consistently with the necessary relative physical isolation thereof.

5. The combination recited in the preceding claim, in which a utilization circuit comprises a two-wire circuit connected to spaced points in said first mentioned conductor adjacent the center thereof and symmetrically positioned with respect to its ends.

CARL R. ENGLUND.